United States Patent [19]
Howell

[11] 3,907,123
[45] Sept. 23, 1975

[54] FUEL ROD PELLET LOADING HEAD
[75] Inventor: Thomas E. Howell, Pasco, Wash.
[73] Assignee: Exxon Nuclear Company Inc., Bellevue, Wash.
[22] Filed: May 31, 1973
[21] Appl. No.: 365,507

[52] U.S. Cl. .............. 214/1 BB; 53/159; 214/18 N; 214/301
[51] Int. Cl. ............................................ B65b 69/00
[58] Field of Search ...... 214/1 B, 1 BB, 18 N, 1 BS, 214/1 BT, 301; 53/88, 159

[56] References Cited
UNITED STATES PATENTS
3,212,226  10/1965  Murray .................................. 53/24
3,735,550  5/1973   Moore ................................ 53/22 R
3,756,914  9/1973   Whittaker ..................... 214/18 N X Primary Examiner—Robert J. Spar
Assistant Examiner—George F. Abraham
Attorney, Agent, or Firm—F. Donald Paris

[57] ABSTRACT

An assembly for loading nuclear fuel pellets into a fuel rod comprising a loading head for feeding pellets into the open end of the rod. The pellets rest in a perforated substantially V-shaped seat through which air may be drawn for removal of chips and dust. The rod is held in place in an adjustable notched locator which permits alignment with the pellets.

9 Claims, 7 Drawing Figures

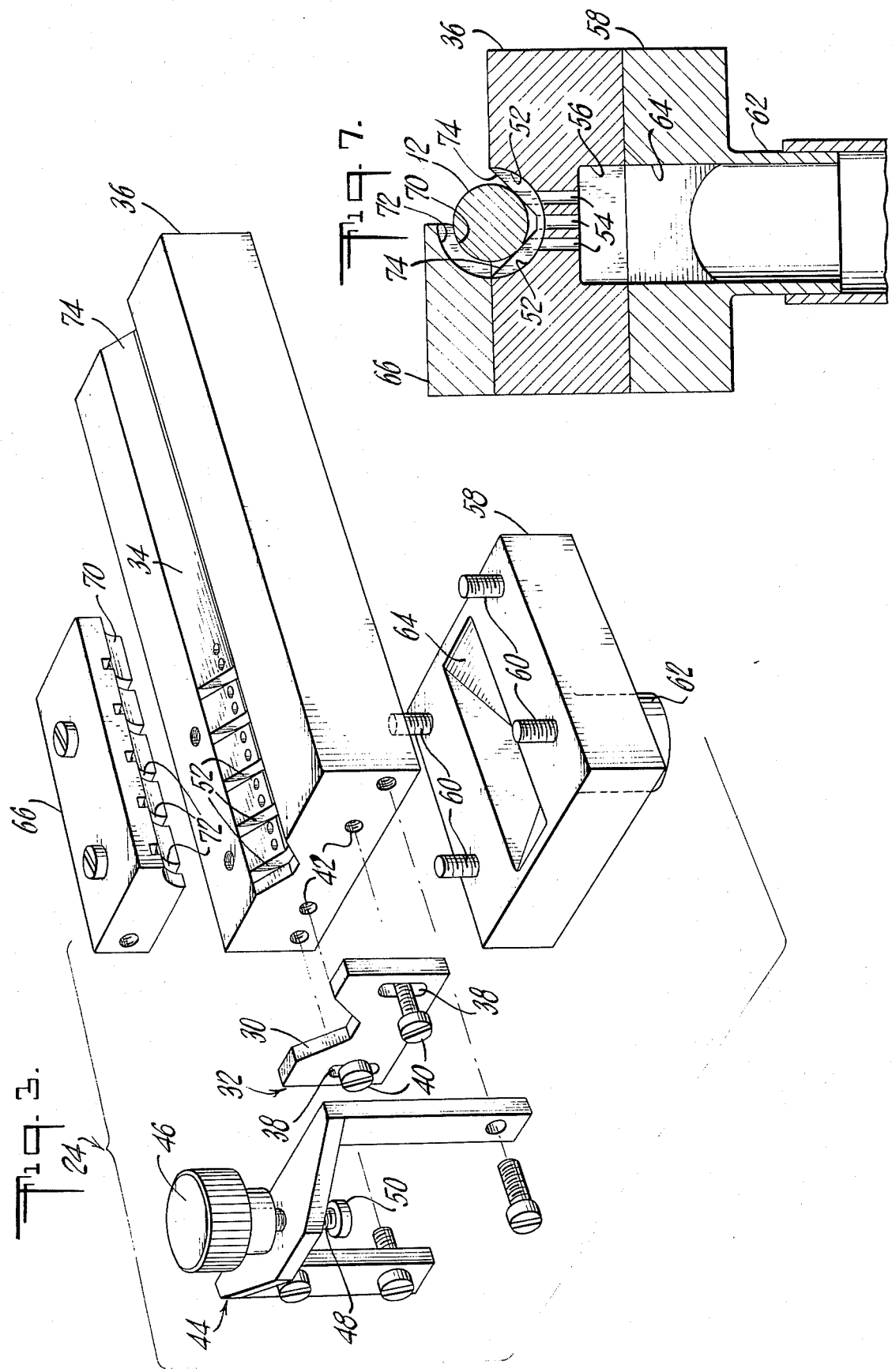

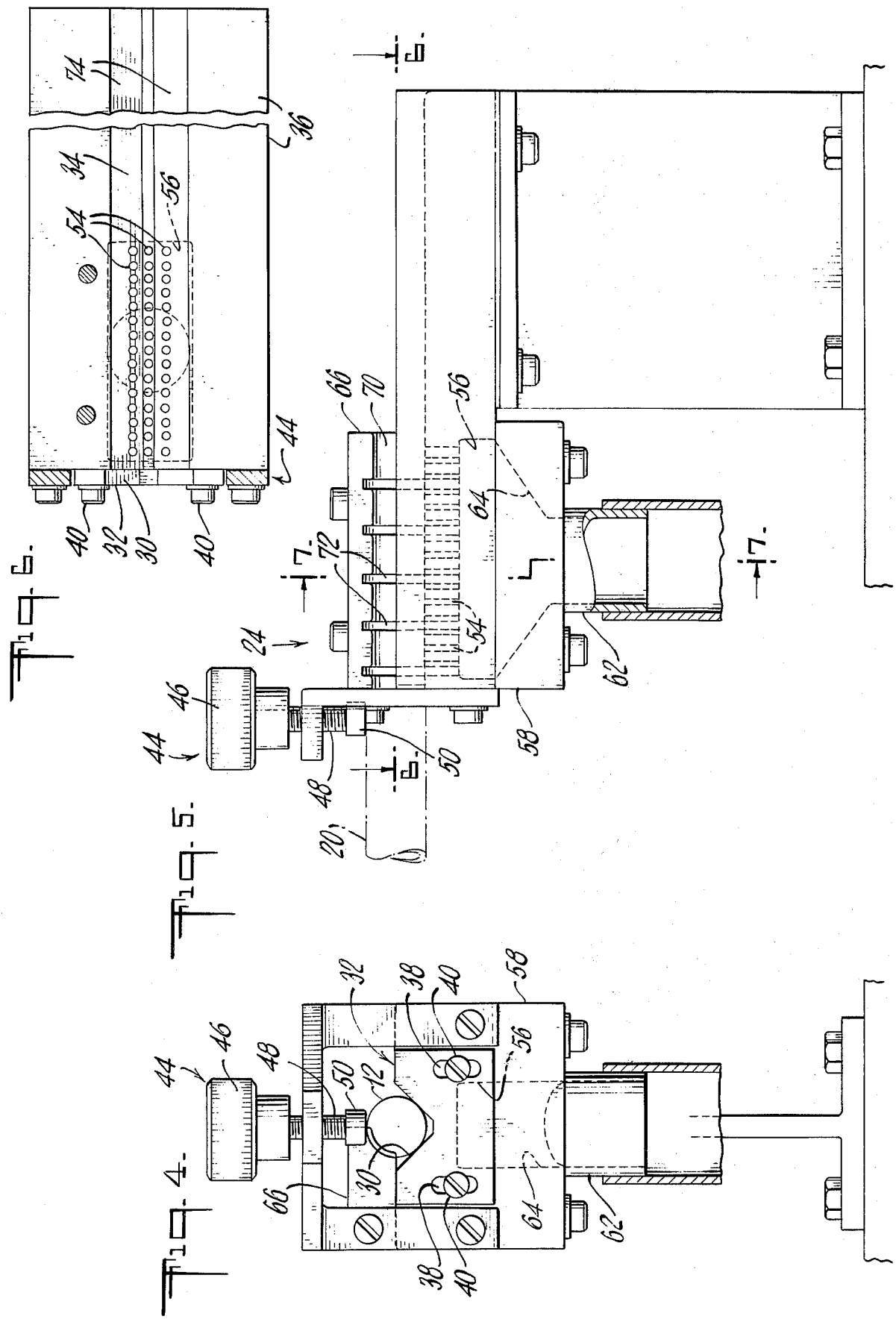

FUEL ROD PELLET LOADING HEAD

CROSS-REFERENCE TO RELATED APPLICATIONS

The present invention comprises an alternate construction and arrangement for a portion of the invention disclosed in U.S. Ser. No. 325,723, filed Jan. 1, 1973, assigned to the same assignee as the present invention. This application is incorporated herein by reference to the extent required for disclosing the general environment in which the present invention has utility.

BACKGROUND OF THE INVENTION

In the nuclear field it is essential in loading nuclear fuel pellets into fuel rods which make up the reactor, to avoid chipping the pellets as they are loaded because of erratic heat transfer between the pellet and the zircaloy tubing. Pellets also can jam in the rod while being loaded because of loose chips. In loading these rods the fuel pellets generally are required to have a maximum of 0.007 inches total clearance. These pellets have sharp corners which are easily chipped and as mentioned above, it is desirable, if not essential, to prevent portions of the pellets from chipping as they are loaded into the rods and falling below or being pushed into the fuel rods. It is required that the loading operation of the fuel pellets into the fuel rods be carried out in an inert atmosphere, so that the moisture content of the pellets is kept at an absolute minimum. Loading operations of nuclear fuel rods heretofore have been carried out in an open atmosphere and with relatively little regard for the pellet chipping problem, which has created a variety of problems such as erratic heat transfer, swelling and bursting of the zircaloy tube, and reactor shutdowns as a consequence.

Thus, it is apparent that there exists a very real need for a fuel rod pellet loading assembly that will avoid and overcome the aforementioned problems, and also will not wear out quickly due to the abrasive nature of uranium dioxide.

SUMMARY OF THE INVENTION

To overcome the deficiencies and disadvantages of prior art fuel rod pellet loading techniques, according to a preferred embodiment of this invention there is provided a loading assembly for use with a glove box having an inert atmosphere and including facilities for weighing the total number of pellets to be placed into each fuel rod and measuring the overall length of these pellets when placed end to end. Reference should be made to the aforementioned copending application U.S. Ser. No. 325,723 for details of the glove box loader as a whole. According to this invention the glove box includes at its loading end a loading head assembly having a locator for receiving the open end of the fuel rod and a fuel pellet seat or trough for directing the pellets from the glove box into the fuel rod. The pellet seat substantially V-shaped and together with the locator, which is vertically adjustable, permits accurate alignment of the fuel rod with the pellets so that they slide smoothly into the rod without chipping. The seat is perforated so that as the pellets are being loaded air can be circulated to remove any chips and dust, which are collected by a suitable filter. The use of the seat has the advantage over spring fingers in that it will have a longer life since it is not as susceptible to damages by the abrasive characteristic of uranium dioxide pellets.

Accordingly, it is a primary object of the present invention to provide a novel and improved loading head assembly for use in the loading of nuclear fuel pellets into fuel rods.

Having in mind the above and other objects and advantages that will be apparent from an understanding of this disclosure, the present invention comprises the construction and arrangements as illustrated in the presently preferred embodiments of this invention, which are hereinafter set forth in such detail as to enable those skilled in the art readily to understand the function, operation, construction and advantages of it when read in conjunction with the accompanying drawings.

BRIEF DESCRIPTION OF THE DRAWINGS

FIG. 3 is an enlarged disassembled perspective view of the pellet loading head assembly employed in the arrangement of FIG. 1.

FIG. 4 is an enlarged end view of the pellet loading head assembly of FIG. 1.

FIG. 5 is an enlarged side elevation view of the pellet loading head assembly of FIG. 4.

FIG. 6 is a cross-sectional view taken substantially on the line 6—6 of FIG. 5

FIG. 7 is a cross-sectional view taken substantially on the line 7—7 of FIG. 5.

DESCRIPTION OF THE PREFERRED EMBODIMENT

Figure 1:
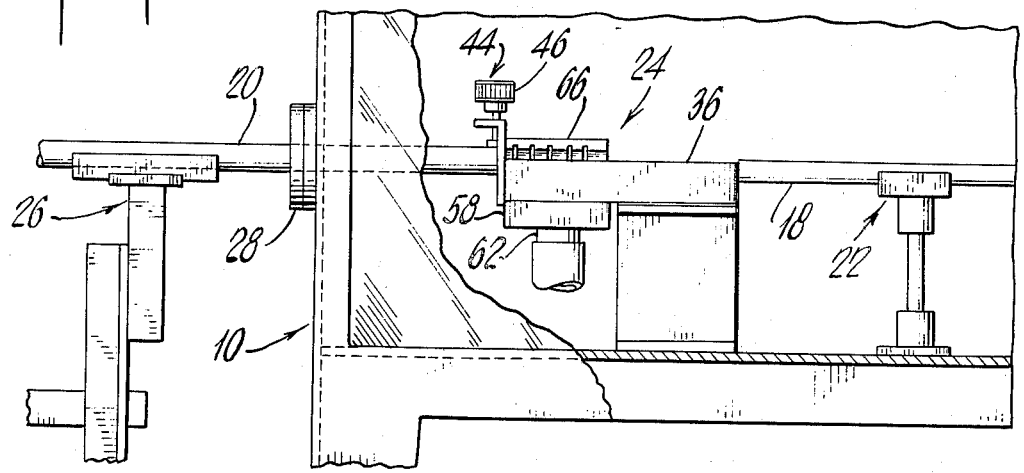
FIG. 1 is a partial side elevation view, partly broken away, of a pellet loading head assembly in a glove box according to the present invention.
Figure 2:
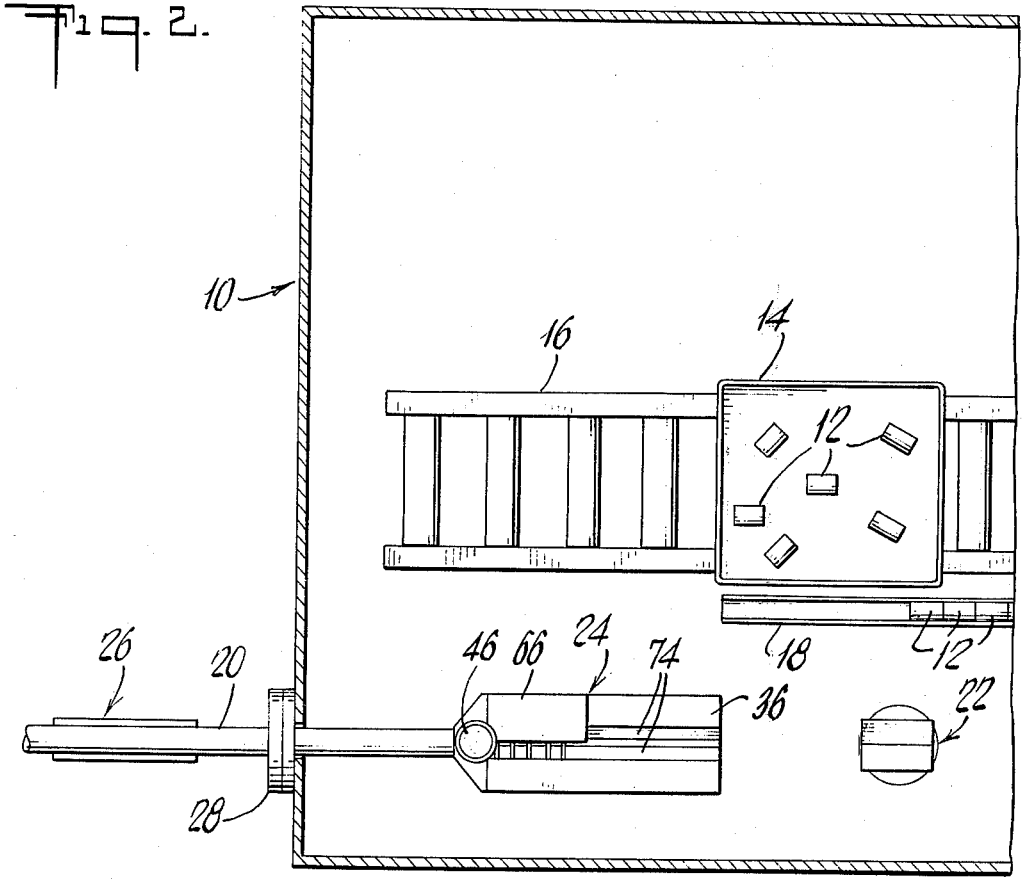
FIG. 2 is a partial top plan view, partly broken away, of the pellet loading head assembly and glove box of FIG. 1.

Having reverence to the drawings wherein like parts are designated by the same reference numeral throughout the several views, the present invention is illustrated in FIGS. 1 and 2 as comprising a suitably supported pellet loading and glove box 10 for receiving nuclear fuel pellets 12 from a standard vacuum furnace (not shown). Once the fuel pellets have been heated and subsequently cooled in the furnace, they are loaded into racks or trays 14 in the glove box. These pellet-containing racks then are placed on a standard roller conveyor 16. Within the glove box 10 there is provided an open-topped pellet trough 18 which is approximately 12 ft. long, corresponding to the length of a normal fuel rod. The trough is adapted to be moved to and fro in a horizontal plane, that is, from the position shown in FIG. 2 toward the front wall of the glove box. Movement of the trough 18 is accomplished by the operator using gloves (not shown) which are mounted at glove ports (not shown) along the length of the glove box. This permits the operator to manipulate the trough and/or the pellets in the desired manner, while still retaining the required inert atmosphere in the glove box. Usually the trough is designed to be of such a length that it receives an entire load of nuclear fuel pellets for a single fuel rod or tube 20 which is to be loaded. The operator arranges the nuclear fuel pellets 12 by removing them from the racks 14 and placing them in end-to-end relationship in the trough 18 (see FIG. 2). The entire load or charge for the fuel rod is then checked for proper length by comparing it with a reference length. Thereafter a balance (not shown) located at a pellet weighing station is activated with the loaded trough disposed on it. The fuel charge is weighed and compared to the desired predetermined total weight for such a load, taking into account the known weight of the trough per se. If the length and/or weight deviates, appropriate corrective measures are taken such as exchanging pellets of the proper weight and/or length with those from another tray of pellets kept at the weighing station for such purposes. This insures that each fuel rod receives the same amount of charge. After weighing, the loaded trough is moved forward onto the support members 22 (only one of which is shown) located in the front of the glove box in substantial alignment with the fuel rod 20 to be loaded. Actual loading of the rod now can take place. The supports 22 can be adjusted so that the pellet-loaded trough 18 is properly aligned with the pellet loading head assembly generally designated 24.

Referring now to FIGS. 3 through 7, wherein the pellet loading head assembly 24 is illustrated in detail, the fuel rod 20, which is supported externally of the glove box by means of a suitable support member 26 (see FIG. 1), is inserted into the glove box 10 through a flexible iris diaphragm seal 28 mounted in the side wall thereof. The tube is received in a V-shaped notch 30 formed in the fuel rod locator 32. The locator, as explained in further detail hereinafter, is vertically adjustable to facilitate alignment of the rod with the adjacent V-shaped pellet loading seat 34 formed in the loading head member 36. Toward this end the locator has laterally-spaced elongated slots 38 for receiving screws 40, which thread into threaded bores 42. The fuel rod, when inserted into the locator 32, is held in place by a clamp 44 having an adjustable torque screw handle 46 in operable engagement with a toggle shoe clamp 48 which carries a nylon shoe 50 at its free end for engaging the fuel rod without damaging it. The fixed pressure thus applied to the rod, together with the vertical adjustment of the locator 32, permits a very accurate alignment of the fuel rod with the pellets to be loaded, so that they slide smoothly into the rod without chipping.

As best shown in FIG. 3, the substantially V-shaped pellet seat 34 (which has a truncated conical configuration) has a plurality of arcuate shaped grooves 52 formed therein and a plurality of holes or apertures 54 extending through the member 36 from the surface of seat 34 to a manifold area 56 at the bottom. These holds 54 are provided (see FIG. 3 and 7) in pairs between adjacent grooves 52, on either side of and in the bottom surface of the seat. Secured to the bottom of the pellet seating member 36 is an adapter 58 conventionally secured thereto by screws 60, which covers the manifold 56. At the bottom of the adapter is a conduit 62, which may be connected to a suitable suction device (not shown). The top surface of the adaptor 58 is provided with a trough 64 of truncated pyramidal shape, which opens into the conduit 62 and is aligned with the manifold 56. A cover block 66 having an arcuate lower surface 70 is conventionally secured to the member 36, with the surface 20 partially overlying the seat 34 for partial contact with the pellets 12 as shown in FIGS. 4 and 7. A further plurality of arcuate grooves 72 are provided in the lower surface 70 of the cover block 66. When mounted as shown in FIGS. 4–7, these grooves 72 together with the grooves 52 and openings 54 in the seat 34 define air circulation channels or passageways for distributing the air about the pellets seated in the seat 34, so that any dust and chips will be removed by the suction devices (not shown) via the manifold 56, trough 64, and the conduit 62. This material in turn can be collected by a suitable conditional filter. The shape and design of the seat 34 permits accurate positioning of pellets of various sizes and also prevents any blockage of the holes 54 since the pellets are in circumferential contact therewith only at two points in the seat 34 (see FIG. 7), namely, the sloping side walls 74. At the top the pellets are in circumferential contact with the adjacent arcuate surface 70. This arrangement permits distribution of air through the grooves 52 and 72 thus insuring removal of any dust and chips that may be present.

It will be appreciated from the foregoing that there has been disclosed a novel and improved pellet loading assembly for nuclear fuel rods. However, it should be understood that the construction and arrangements herein illustrated and described are intended to be representative of only preferred embodiments and that certain changes readily may be made therein without departing from the clear teachings and scope of the present invention. Accordingly, reference should be made to the following appended claims in determining the full scope of this invention.

What is claimed is:

1. In an assembly for the loading of nuclear fuel pellets into a fuel rod, including a main housing having an inert atmosphere and adapted to receive fuel pellets for loading into elongated fuel rods and a longitudinal extending trough for receiving pellets in end-to-end relationship, wherein the improvement comprises a pellet loading assembly disposed for longitudinal alignment with said trough and said fuel rod, said assembly including a member having a seat for slidably receiving fuel pellets longitudinally from said trough, means for providing relative adjustable vertical alignment between said fuel rod and said seat, said seat being constructed and arranged so that said seat will substantially tangentially contact said pellets for the length thereof only at two locations, whereby the pellets will be transferred from said loading trough to said fuel rod without chipping thereof.

2. The assembly of claim 1 wherein said seat has a truncated configuration including a pair of opposed sloping sides for tangential contact with said pellets.

3. The assembly of claim 1 wherein said seat includes a first plurality of arcuate grooves traversing said seat.

4. The assembly of claim 3 wherein said seat includes at least one opening located between said adjacent ones of said grooves and extending lengthwise between said seat and a manifold located at the bottom thereof.

5. The assembly of claim 1 wherein said means for providing relative adjustable vertical alignment between said fuel rod and said seat includes vertical extending slots.

6. In an assembly for loading of nuclear fuel pellets into a fuel rod, including a main housing having an inert atmosphere and adapted to receive fuel pellets for loading into fuel rods, and a trough for receiving said pellets in end-to-end relationship, wherein the improvement comprises a pellet loading assembly disposed for alignment with said trough and said fuel rod, said assembly including a member having a seat for slidably receiving said fuel pellets, said seat being constructed and arranged so that said seat will substantially tangentially contact said pellets for the length thereof only at two locations, said assembly including a notched fuel rod locator member operably supporting said fuel rod at one end thereof and mounted for adjustable vertical movement relative to said seat so that the notch of said locator member may be properly vertically aligned relative to said seat to facilitate the transfer of pellets from said loading assembly into said fuel rod, whereby the pellets will be transferred from said loading trough to said fuel rod without substantial chipping thereof.

7. The assembly of claim 6 including means for securing said fuel rod in position in said notched member.

8. The assembly of claim 6 wherein said notched fuel rod locator member includes at least a pair of laterally spaced slots which extend in a vertical direction for permitting said adjustable vertical movement of said fuel rod relative to said seat.

9. In an assembly for the loading of nuclear fuel pellets into a fuel rod, including a main housing having an inert atmosphere and adapted to receive fuel pellets for loading into fuel rods, and a trough for receiving said pellets in end-to-end relationship, wherein the improvement comprises a pellet loading assembly disposed for alignment with said trough and said fuel rod, said assembly including a member having a seat for slidably receiving said fuel pellets, said seat being constructed and arranged so that said seat will substantially tangentially contact said pellets for the length thereof at only two locations, said seat further including a first plurality of arcuate grooves traversing said seat, and said pellet loading assembly including cover means disposed at least in partial overlying relationship relative to said seat and having a lower surface including a second plurality of arcuate grooves for cooperation with said first plurality of grooves to define air passageways about said pellets when they are located between said seat and said cover means, whereby the pellets will be transferred from said loading trough to said fuel rod without substantial chipping thereof.

* * * * *